United States Patent [19]

Moroto et al.

[11] Patent Number: 4,735,598

[45] Date of Patent: Apr. 5, 1988

[54] CONTINUOUSLY VARIABLE V-BELT TRANSMISSION

[75] Inventors: Shuzo Moroto, Handa; Shiro Sakakibara, Toyokawa; Masahiro Hasebe; Masashi Hattori, both of Anjo, all of Japan

[73] Assignee: Aisin-Warner Kabushiki Kaisha, Aichi, Japan

[21] Appl. No.: 881,057

[22] Filed: Jul. 1, 1986

[30] Foreign Application Priority Data

Jul. 10, 1985 [JP] Japan .................................. 60-153130
Jul. 10, 1985 [JP] Japan .................................. 60-153133
Dec. 28, 1985 [JP] Japan .................................. 60-298794

[51] Int. Cl.$^4$ ............................................. F16H 9/18
[52] U.S. Cl. ......................................... 474/29; 474/30
[58] Field of Search ....................... 474/29, 30, 31, 52, 474/49

[56] References Cited

U.S. PATENT DOCUMENTS

| | | | |
|---|---|---|---|
| 683,241 | 9/1901 | Anck | 474/30 |
| 2,262,782 | 11/1941 | Strom | 474/29 |
| 2,486,524 | 11/1949 | Dulaney | 474/29 X |
| 2,589,897 | 3/1952 | Turnbull | 474/29 |
| 2,604,794 | 7/1952 | Scott | 474/29 |
| 2,893,254 | 7/1959 | Grover | 474/29 X |
| 3,375,733 | 4/1968 | Browning | 474/29 X |
| 4,541,821 | 9/1985 | Sakakibara | 474/17 |

Primary Examiner—Stephen J. Novosad
Assistant Examiner—Thuy M. Bui
Attorney, Agent, or Firm—Wenderoth, Lind & Ponack

[57] ABSTRACT

Pulleys are provided with load cam mechanisms which exert axial forces corresponding to transmitted torque, and actuator means such as ball screw mechanisms which shift the movable sheaves of both pulleys in axial direction, wherein the axial forces occuring at the pulleys are carried by their shafts and do not act on the housing. A counter shaft is located between the primary and secondary shafts, the countershaft being rotated to drive the actuator means through gearing such as gearwheels, to alter the drive ratio. During power transmission, the axial forces acting on the movable sheaves of primary and secondary pulleys are converted into torque by the actuator means, where the torques are transmitted to the counter shaft in the form of counteracting torques, so that alteration of drive ratio can be made with slight effort on the counter shaft, equivalent ot the difference between the counteracting torques.

By using a non-uniform cam mechanism for the actuator means, or by using non-circular gearwheels for the gearing, the displacements of the movable sheaves are matched with their proper displacements determined by the belt.

28 Claims, 12 Drawing Sheets

CONTINUOUSLY VARIABLE V-BELT TRANSMISSION

BACKGROUND OF THE INVENTION

1. Field of the Invention

The present invention relates to continuously variable V-belt transmissions, and more particularly to those suitable for use on motor vehicles.

2. Description of the Prior Art

In general, continuously variable V-belt transmissions (CVT) of the type mentioned above consist of primary and secondary pulleys each in turn consisting of movable and fixed sheaves, with a metallic belt placed around the two pulleys. The drive ratio is adjusted by shifting the movable sheaves by means of hydraulic pistons.

Because such continuously variable transmissions rely on hydraulic power, they require an oil pump and hydraulic circuitry, which render the transmission very complex in structure and cumbersome. They also exert unnecessarily strong clamping forces on the belt, resulting in reduced transmission efficiency and belt durability. Furthermore, in the event of a drop in hydraulic pressure, the clamping force on the belt becomes insufficient, making it incapable of transmitting power.

In order to overcome such problems a continuously variable V-belt transmission has been proposed recently, as described in U.S. Pat. No. 4,504,247, in which the movable sheaves of primary and secondary pulleys are provided with load cam mechanisms which exert axial forces corresponding to applied torque, the load cam mechanisms being interconnected by a linkage so that the axial forces generated by the load cams are exerted on both pulleys, and in which a drive ratio selector is provided on the movable shear of primary pulley to establish the required drive ratio.

Whereas the continuously variable transmission mentioned above is satisfactory in that it generates an axial force corresponding to the torque load imposed, and does not exert excessive clamping force on the belt, it is structurally very complex due to the load cam mechanisms on the primary and secondary pulleys being interconnected by a linkage. Also, as the reactions of axial forces generated by the drive ratio selector in the form of belt clamping force are exerted on the transmission housing, the housing must have considerable rigidity.

Meanwhile, in continuously variable V-belt transmissions, if the movable sheaves on both pulleys are shifted by equal amounts when altering the drive ratio, the displacements of the sheaves would differ from their proper displacements determined by the belt. As shown in FIG. 17, the displacement A of the movable sheave of the primary pulley and the displacement B of the movable sheave of the secondary pulley, both determined by the belt, differ from each other over the whole range of torque ratio. The difference d in their displacements is largest at a torque ratio of one, and gradually decreases towards both extremes in overdrive (O/D) and underdrive (U/D) positions. However, since the movable sheaves on both pulleys are shifted by equal displacements in the above-mentioned continuously variable transmission, their actual displacements differ from their proper displacements as determined by the belt.

In the continuously variable transmission mentioned above, said difference in displacement is absorbed by displacing the load cam mechanisms. However, continuously variable transmissions for use on motor vehicles not only transmit positive torque from the engine, but also negative torque when applying the engine brake. The load cam structure is displaced by a large amount when the direction of transmitted torque is reversed, causing a fluctuation in torque due to the rapid change in relative rotation in the load cam mechanisms, which may in turn lead to reduction in the durability of load cam mechanisms, and to a deterioration of performance.

SUMMARY OF THE INVENTION

The first objective of the present invention is to provide a continuously variable V-belt transmission which solves the problems mentioned above with a simple construction, wherein the actuator mechanisms which shift the movable sheaves of the primary and secondary pulleys are interconnected through a counter shaft.

The second objective of the present invention is to reduce the axial displacement of the load cam mechanism and to improve the reliability and performance of the continuously variable V-belt transmission, by arranging the actuator means for axially shifting the movable sheaves in such a way that the axial displacements of the movable sheaves match their proper displacements as defined by the belt.

The present invention has been made with the above-mentioned objectives in mind, and includes a load cam mechanism on at least one of the pulleys, which exerts an axial force on the pulley corresponding to the torque to be transmitted, and actuator means which shifts the movable sheaves of both pulleys in the axial direction.

The axial forces acting on both pulleys are carried by the shafts either directly or through the actuator means or load cam mechanisms. A countershaft is located between the primary and secondary shafts which are each fitted with a pulley. The counter shaft is connected to a shift driver means, and to the actuator means on both primary and secondary shafts through gearing. It is characterized by the movable sheaves of both pulleys being adjusted in the axial direction by rotating a part of the actuator mechanism relatively against another part through rotation of the counter shaft.

Preferably, at least one of the actuator means, for example the actuator means on the secondary shaft, consists of a non-uniform stroke cam mechanism which displaces non-linearly in the axial direction with respect to the angle of rotation, to match the axial displacements of the movable sheaves of both pulleys with their proper displacements as determined by the belt.

Alternatively, one or both of the gearing may consist of non-linear gearing, such as non-circular gearwheels, to match the displacements of the movable sheaves of both pulleys with their proper displacements determined by the belt, by rotating the actuator means non-linearly.

DETAILED DESCRIPTION OF THE PREFERRED EMBODIMENTS

The preferred embodiments of the present invention shall now be described in detail making reference to the figures.

Figure 1:
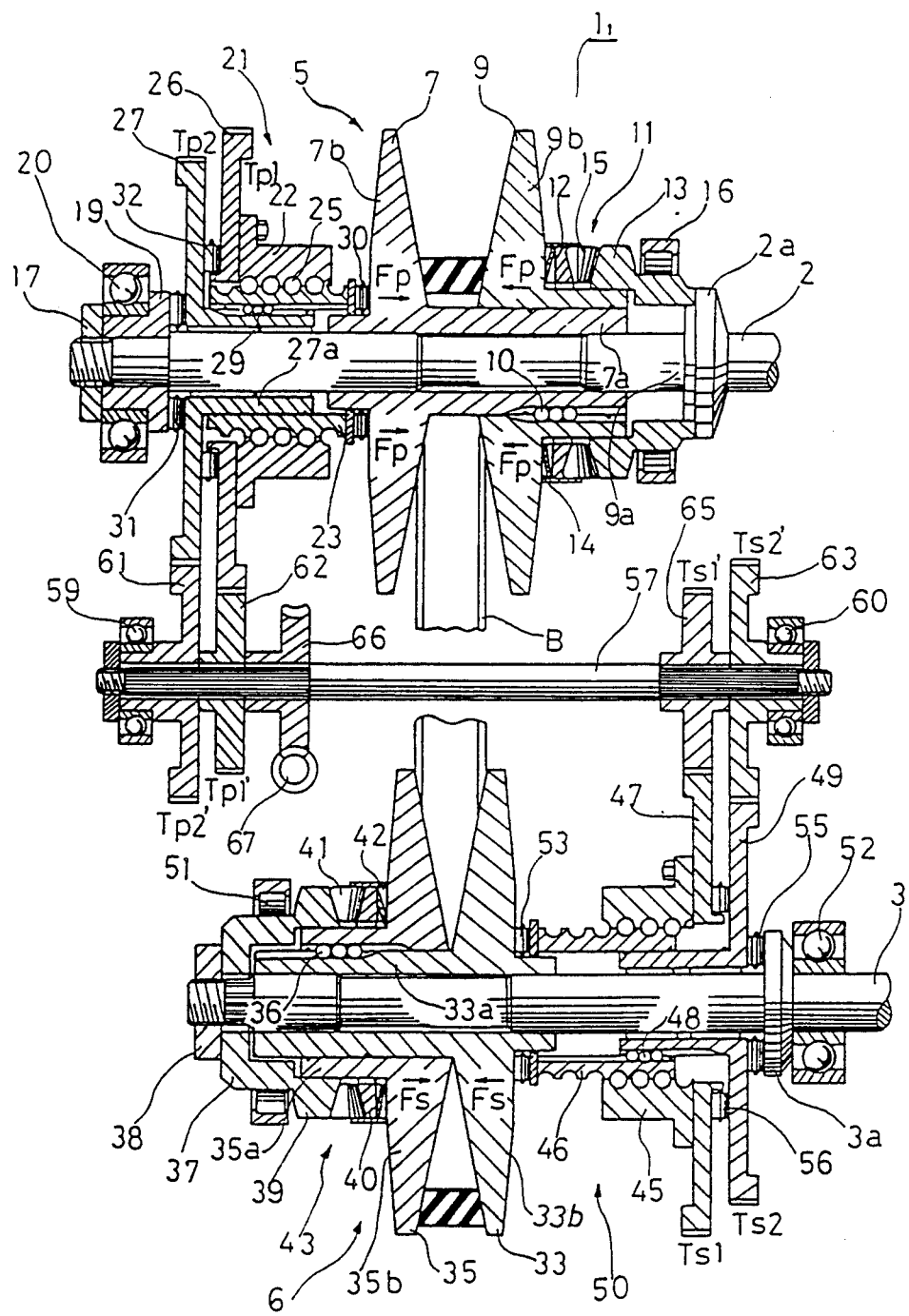
FIG. 1 is a cross sectional view of the first embodiment of the present invention.

As shown in FIG. 1, the continuously variable V-belt transmission $1_1$ according to the first embodiment of the present invention includes a primary shaft 2 drivingly connected to the engine and a secondary shaft 3 drivingly connected to the the wheels, wherein the primary shaft 2 is fitted with a primary pulley 5 and the secondary shaft 3 is fitted with a secondary pulley 6, with an endless belt B placed between the pulleys 5 and 6. The primary pulley 5 consists of a movable sheave 7 and a fixed sheave 9 relatively slidable in relation to each other in axial direction. The hub portion 7a of the movable sheave 7 is rotatably and slidably mounted on shaft 2, and is connected to the hub portion 9a of the fixed sheave 9 by ball spline 10, allowing relative sliding motion only. A load cam mechanism 11 is located between the backside of flange portion 9a of fixed sheave 9 and a flange portion 2a of increased diameter on shaft 2. This load cam mechanism consists of a movable race 12, fixed race 13, and several tapered rollers 15, wherein the movable race 12 is splined to fixed sheave 9 through and is pressing against the backside of its flange portion 9a through a disk spring 14, and wherein the fixed race 13 is fixed to the flange portion 2a and rotatably supported on the housing (not shown) through bearing 16. The opposing faces of races 12 and 13 are formed with wavelike undulations with the tapered rollers 15 clamped in between, so as to exert an axial force $F_p$ on sheave 9 corresponding to the positive or negative torque transmitted between races 12 and 13.

A stepped collar 19 is fixed to the end of shaft 2 by a nut 17, the collar 19, and consequently the shaft 2 being supported by bearing 20. A ball screw mechanism 21, which comprises the actuator means for altering the drive torque ratio, is located between the collar 19 and the backside of flange portion 7b of sheave 7. The ball screw mechanism 21 includes a female thread portion 22, male thread portion 23 and numerous balls 25, and also two gearwheels 26, 27 with differing number of teeth. The gearwheel with the larger number of teeth 26 is fixed to the female thread portion 22, while the other gearwheel with the smaller number of teeth 27 is mounted onto shaft 2 at its hub 27a through a needle bearing, and slidably connected to the male thread portion 23 by ball spline 29, allowing sliding motion in axial direction only. One end of the male thread portion 23 is in contact with the backside of flange portion 7b through thrust bearing 30, while the other end of gearwheel 27 is in contact with the end face of collar 19 through thrust bearing 31. Another thrust bearing 32 is placed inbetween the opposing faces of gearwheels 26 and 27.

The secondary pulley 6 also consists of a pair of sheaves 33 and 35, wherein the hub portion 33a of the movable sheave 33 is rotatably and slidably mounted on shaft 3, and connected to the hub portion 35a of the fixed sheave 35 through ball spline 36, allowing relative sliding motion only. In a manner similar to the primary pulley 5, between the backside of flange portion 35b of the fixed sheave 35 and collar (37 fixed to the end of shaft 3 with a nut 38) is located a load cam mechanism consisting of a fixed race 39 formed in one piece with collar 37, movable race 40, tapered rollers 41 and dished spring 42. Also likewise to the primary pulley 5, a ball screw mechanism 50 consisting of a female thread portion 45, male thread portion 46, balls, large gearwheel 47, small gearwheel 49 and ball spline 48 is located between the backside of flange portion 33b of movable sheave 33 and flange portion 3a of increased diameter on shaft 3. In the figure, 51 and 52 designate the bearings supporting the shaft 3, and 53, 55, and 56 designate the thrust bearings supporting the axial force $F_s$ exerted by sheave 33.

Between the primary and secondary shafts 2 and 3 a countershaft 57, whose ends are supported by bearings 59 and 60, is located. On one end of the countershaft, a large gearwheel 61 and a small gearwheel 62 are fixed by splines, wherein the gearwheels 61 and 62 each mesh respectively with the small gearwheel 27 and the large gearwheel 26 of the ball screw mechanism 21 on the primary shaft. On the other end of shaft 57, a large gearwheel 63 and a small gearwheel 65 are fixed by splines, wherein the gearwheels 63 and 65 each mesh respectively with the small gearwheel 49 and the large gearwheel 47 of the ball screw mechanism 50 on the secondary shaft. A wormwheel 66 is splined to shaft 57, and wormwheel 66 meshes with a worm 67 drivingly connected to a shift driver means, such as a motor.

With the first embodiment constructed as described above, the rotation of primary shaft 2 by the engine is transmitted through flange portion 2a to the fixed race 13 of load cam mechanism 11, then through the tapered rollers 15 and movable race 12 to the sheave 9 of primary pulley 5. Meanwhile, an axial force $F_p$ corresponding to the torque transmitted between the fixed and movable races 13 and 12 of the load cam mechanism, equivalent to the input torque applied to shaft 2, is exerted on the backside of sheave 9 through disk spring 14. At the same time, with the ball screw mechanism 21 in fixed axial position corresponding to the designated drive ratio, an axial force $F_p$ of equal magnitude is exerted on the backside of sheave 7 through the thrust bearing 30. Thus, the primary pulley 5 holds the belt B under clamping force $F_p$ corresponding to the input torque. The reacting force on sheave 9 is carried by the flange portion 2a of shaft 2 through the load cam mechanism 11, and the reacting force on sheave 7 is carried by the collar 19 and nut 17 fixed to shaft 2 through thrust bearing 30, ball screw mechanism 21 and thrust bearing 31. The torque acting on pulley 5, which rotates as one piece owing to ball spline 10, is transmitted to the secondary pulley 6 through belt B, and is further transmitted to the secondary shaft 3 through the load cam mechanism 43. At the same time, an axial force corresponding to the output torque to be transmitted to the secondary shaft 3 is exerted by load cam mechanism 43 on sheave 35 through disk spring 42, while reacting force $F_s$ from the ball screw mechanism 50 acts on the backside of sheave 33 which is in its fixed condition. Thus the secondary pulley 6 also holds the belt B under a clamping force $F_s$ corresponding to the output torque. The reaction force on sheave 35 is carried by the nut 38 fixed to shaft 3 through the load cam mechanism 43, and the reaction force on sheave 33 is carried by the flange portion 3a of shaft 3 through thrust bearing 53, ball screw mechanism 50 and thrust bearing 55. During transmmison in the above explanation, both disk springs 14 and 42 are overcome by the axial forces $F_p$ and $F_s$ generated by load cam mechanisms 11 and 43, and are compressed against sheave 9 and movable race 12 or sheave 35 and movable rave 40, leaving no gaps in between.

Although the above explanation has been made for the case of positive torque transmission from the engine to the wheels, under conditions of negative torque transmission from the wheels to the engine, such as encountered when applying engine brake, the secondary shaft acts as the input shaft and the primary shaft acts as the output shaft, enabling power transmission under axial forces corresponding to transmitted torque in a similar manner. During transition from positive to negative torque transmission and vice verse, although the axial forces $F_p$ and $F_s$ momentarily become almost zero, resulting in slack in the load cam mechanisms 11 and 43 owing to reversal of the direction of torque transmission, the necessary clamping forces on the belt can be maintained by disk springs 14 and 42.

To alter the drive ratio on the present continuously variable V-belt transmission, the rotation of the motor drivingly connected to the worm 67 is controlled according to various parameters representing the operating condition of the vehicle, such as vehicle speed, throttle setting, and engine revolutions. For example, by rotating the worm 67 in a clockwise, or upshift direction, the wormwheel 66 is rotated clockwise when seen from the right hand side of the figure, splined gearwheels 61, 62, 63 and 65 through the countershaft 57. This causes gearwheels 26 and 27 of the ball screw mechanism 21 on the primary shaft to rotate anti-clockwise, wherein the smaller gearwheel 27 rotates at a greater rate than the larger gearwheel 26 owing to the difference in the number of teeth. Hence, the male thread portion 23 entrained to rotate with gearwheel 27 by ball spline 29 rotates at a greater rate than the female thread portion 22 which rotates with the gearwheel 26, causing the right-hand-threaded ball screw mechanism 21 to expand rightward, which in turn shifts the movable sheave 7 through thrust bearing 30 to reduce the gap between sheaves 7 and 9, and, hence, increase the effective diameter of belt B. Similarly, owing to the relative anti-clockwise rotation of gearwheels 49 and 47 of the ball screw mechanism 50 on the secondary shaft 3 by gearwheels 63 and 65, the male thread portion 46 which rotates with gearwheel 49 rotates at a greater rate than the female thread portion 45 which rotates with gearwheel 47, causing the ball screw mechanism consisting of right hand thread to contract rightward, which in turn shifts the movable sheave 33 to increase the gap between sheaves 33 and 35, and reduce the effective diameter of belt B. Although the male thread portions 23 and 46 of the ball screw mechanisms 21 and 50 move relative to the female portions 22 and 45, the meshing between the gearwheels can be maintained without using gearwheels of large thickness, since the male thread portions 23 and 46 are connected to the gearwheels 27 and 49 through ball splines 29 and 48.

By rotating the worm 67 in the anticlockwise, or downshift direction, the upshift process which has been described above is reversed, with the ball screw mechanism 21 on the primary shaft contracting leftward and the ball screw mechanism 50 on the secondary shaft expanding leftward, shifting both pulleys 5 and 6 in downshift direction.

While transmitting power through this transmission, the axial forces $F_p$ and $F_s$ (hereafter referred to simply as F) caused by the load cam mechanisms 11 and 43 act on sheaves 9 and 35 through the movable races 12 and 40, and act at the same time on shafts 2 and 3 through fixed sheaves 13 and 39. The axial forces F acting on fixed sheaves 9 and 35 act to push the male thread portions 23 and 46 of the ball screw mechanisms 21 and 50, through movable sheaves 7 and 33, and further through thrust bearings 30 and 53. Also, the axial forces F acting on shafts 2 and 3 act to push the female thread portions 22 and 45 through the collar 19 or flange portion 3a, thrust bearings 31 and 55, gearwheels 27 and 49, and thrust bearings 32 and 56. Therefore both ball screw mechanisms 21 and 50 on the primary and secondary shafts are subjected to compressive force all the time while transmitting power, and generate a torque owing to this force. In otherwords, on the primary shaft, the larger gearwheel 26 and the smaller gearwheel 27 each generate anti-clockwise and clockwise torques $T_{p1}$ and $T_{p2}$ respectively, while on the secondary shaft, the larger gearwheel 47 and the smaller gearwheel 49 each generate clockwise and anti-clockwise torques $T_{s1}$ and $T_{s2}$ respectively. These torques are respectively transmitted to gearwheels 62, 61, 65 and 63 on the counter shaft ($T_{p1}'$, $T_{p2}'$, $T_{s1}'$, $T_{s2}'$) and cause, owing to the gear ratio, an anti-clockwise torque ($T_{p2}'-T_{p1}'$) on the primary end of shaft 57, and a clockwise torque ($T_{s2}'-T_{s1}'$) on the secondary end of shaft 57. In other words, there always exist a pair of counteracting touques acting on the countershaft while the transmission is transmitting power, and therefore it is sufficient to apply a driving effort equivalent to the difference between these counteracting torques, in order to rotate the shaft 57. Hence, shaft 57 can respond swiftly and smoothly with small power. Under a constant drive ratio condition, the ball screws are mechanically immobilized by the worm.

Figure 2:
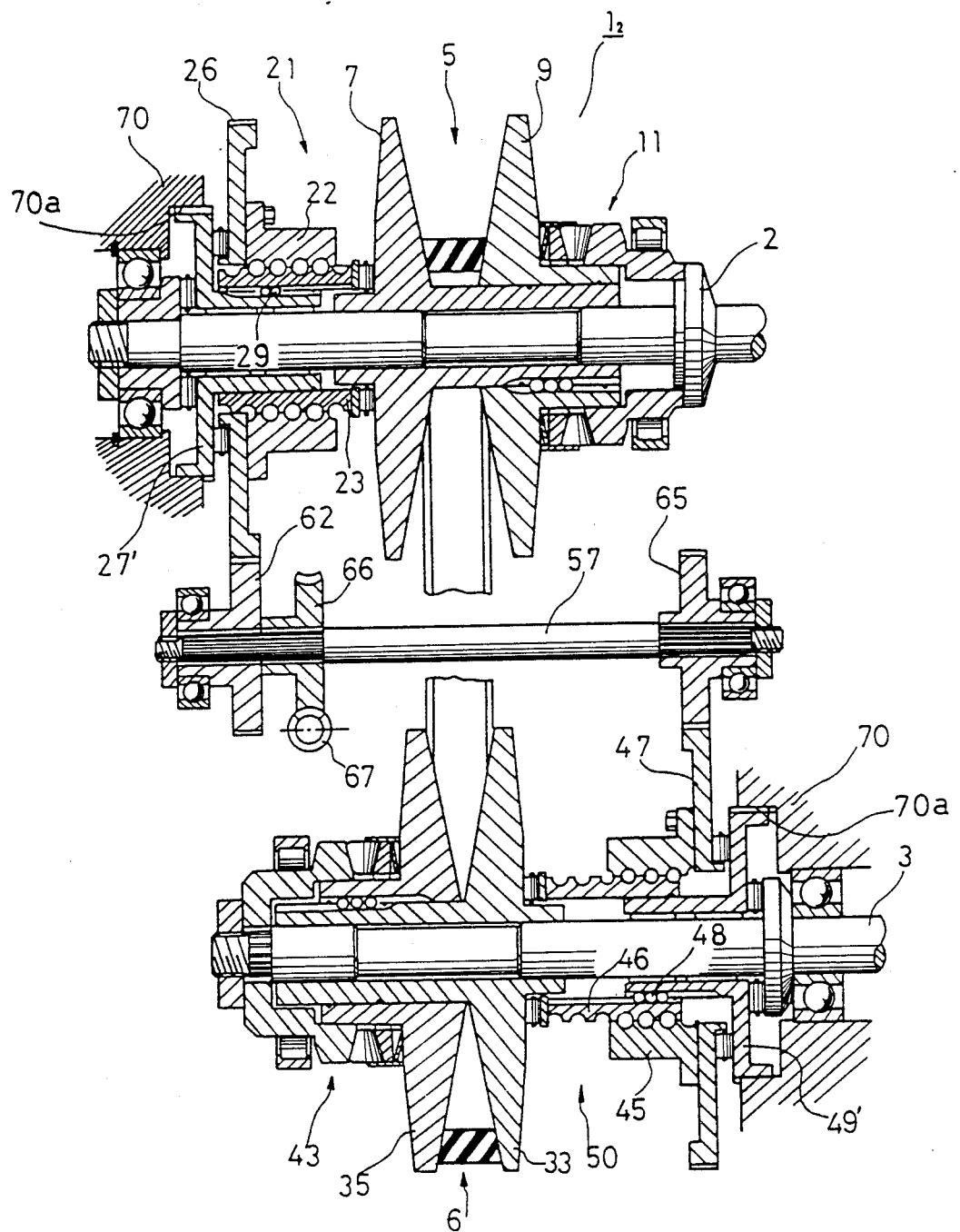
FIG. 2 is a cross sectional view of the second embodiment of the present invention.

Next, the second embodiment of the present invention shall be described by referring to FIG. 2.

In contrast to the first embodiment wherein the rotation of countershaft 57 is transmitted to both female thread portions 22, 45 and male thread portions 23, 46 of the ball screw mechanisms 21, 50, in this embodiment, either of the threaded portions, for example the male thread portions 23, 46 are fixed and unrotatable. To be more precise, members 27' and 49' connected to the male thread portions 23 and 46, are engaged with internal spline 70a formed in the housing 70 to prevent them from rotating.

Thus, the rotation of counter shaft 57 is transmitted to gearwheels 26 and 47 of ball screw mechanisms 21 and 50 on the primary and secondary shafts through gearwheels 62 and 65, to rotate the female thread portions 22 and 45 only. As the male thread portions 23 and 46 are prevented from rotating by members 27' and 49', the female thread portions 22, 45 and male thread portions 23, 46 rotate relative to each other, the male thread portions 23 and 46 moving axially according to the direction of rotation of countershaft 57, hence adjusting the movable sheaves 7 and 33 in their axial positions.

Figure 3:
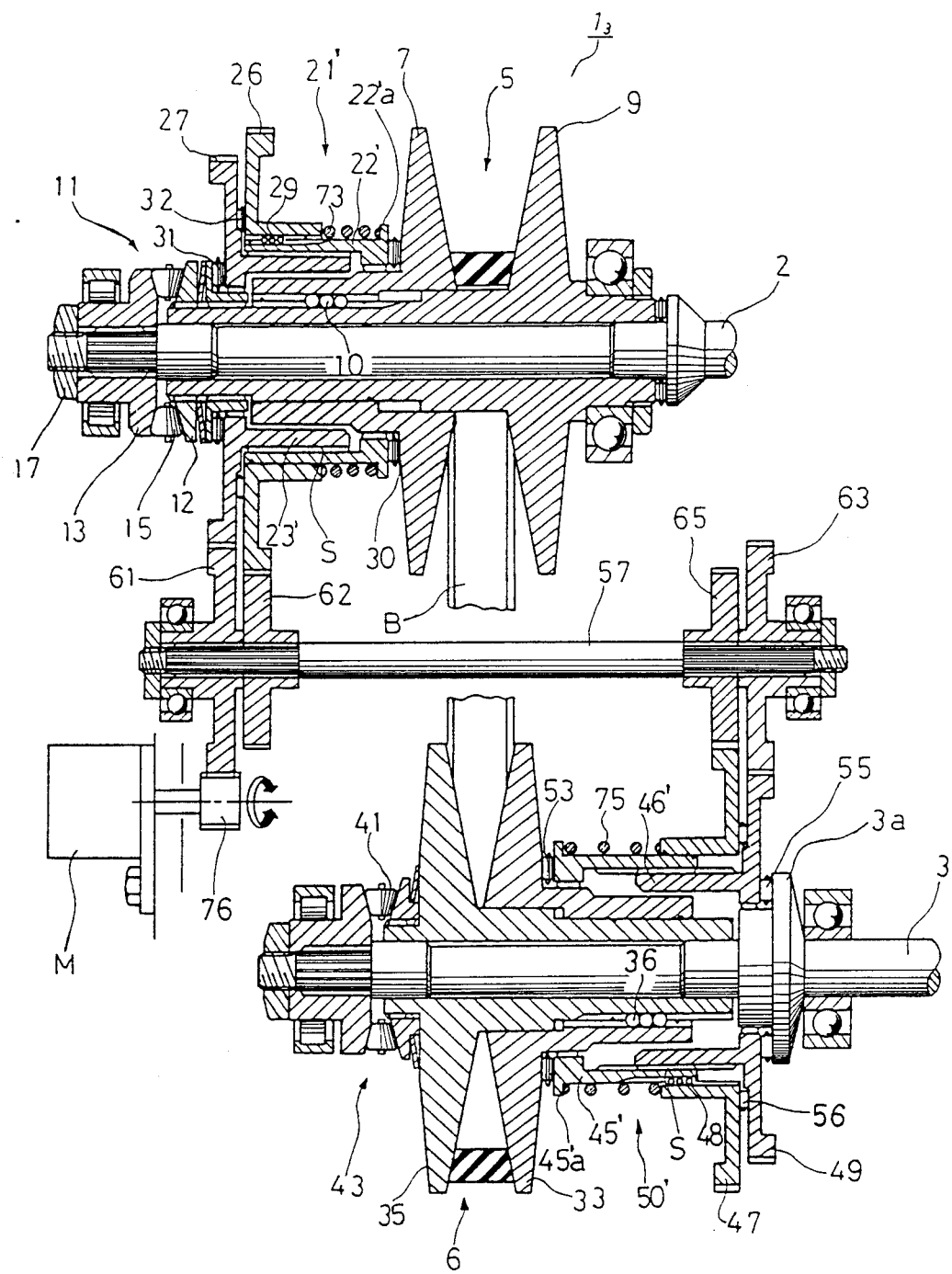
FIG. 3 is a cross sectional view of the third embodiment of the present invention.

The third embodiment of the present invention shall now be described with reference to FIG. 3.

In the third embodiment, an ordinary thread, such as square thread is used in place of the ball screw mechanism of the first embodiment, and the load cam mechanism on the primary shaft is placed next to the movable sheave. The screw mechanisms 21' and 50' on the primary and secondary shafts consist of female thread portions 22', 45' and male thread portions 23', 46' each having an ordinary thread such as square thread. The female thread portions 22' and 45' are connected to the hub portions of gearwheels 26 and 47 through ball splines 29 and 48, with springs 73 and 75 placed under compression between the ends of hub portions and flanges 22'a and 45'a formed on the ends of female thread portions 22' and 45', so that gearwheels 26 and 47 are positioned in contact with thrust bearings 32 and 56, while the ends of female thread portions 22' and 45' are pressed against the backsides of the movable sheaves 7 and 33 through thrust bearings 30 and 53. The male thread portions 23' and 46' have gearwheels 27 and 49 formed integrally, and oppose the load cam mechanism 11 (on the primary shaft) and flange portion 3a (on the secondary shaft) through thrust bearings 31 and 55. The load cam mechanism 11 on the primary shaft consists of a fixed race 13 fixed to the end of primary shaft by nut 17, and a movable race 12 connected to the end of the hub portion of fixed sheave 9 through splines. The screw mechanisms 21' and 50' can have reduced diameter owing to the absence of balls, thus enabling the location of ball splines 10 and 36 interconnecting the movable and fixed sheaves 7 and 9, 33 and 35 on the same side as the screw mechanism. The load cam mechanisms are urged by disk spings so that the ends of the races are always in contact with rollers 15 and 41. An output gearwheel 76 of the motor M which serves as the shift driver means meshes with a gearwheel on countershaft 57, for example gearwheel 61.

Thus, the rotation of primary shaft 2 is transmitted to the fixed sheave 9 through load cam mechanism 11, and to the movable sheave 7, then through belt B to the secondary pulley 6, and to the secondary shaft through load cam mechanism 43. Alteration of the drive ratio is achieved by rotating the countershaft 57 by motor M through gearwheels 76 and 61, to cause relative rotation between the female thread portions 22', 45' and male thread portions 23', 46', which in turn causes the axial displacement of the female thread portions 22' and 45', of the movable sheaves 7 and 33.

Under the present embodiment, because the actuator means has an ordinary thread with large resistance, the axial forces acting on the pulleys are not converted directly into torque unless the threads have large lead angles. However, there still exists a tendency to rotate the female and male thread portions of the screw mechanisms 21' and 50' relatively to each other, which becomes evident when a driving effort is applied from the countershaft 57, so that the drive ratio can be altered with a slight driving effort.

An embodiment of the present invention using cam mechanisms as actuators shall now be described. As the construction of the primary shaft and countershaft is identical to that of the first embodiment, like components are designated by like numerals, and their description shall be omitted.

Figure 4:
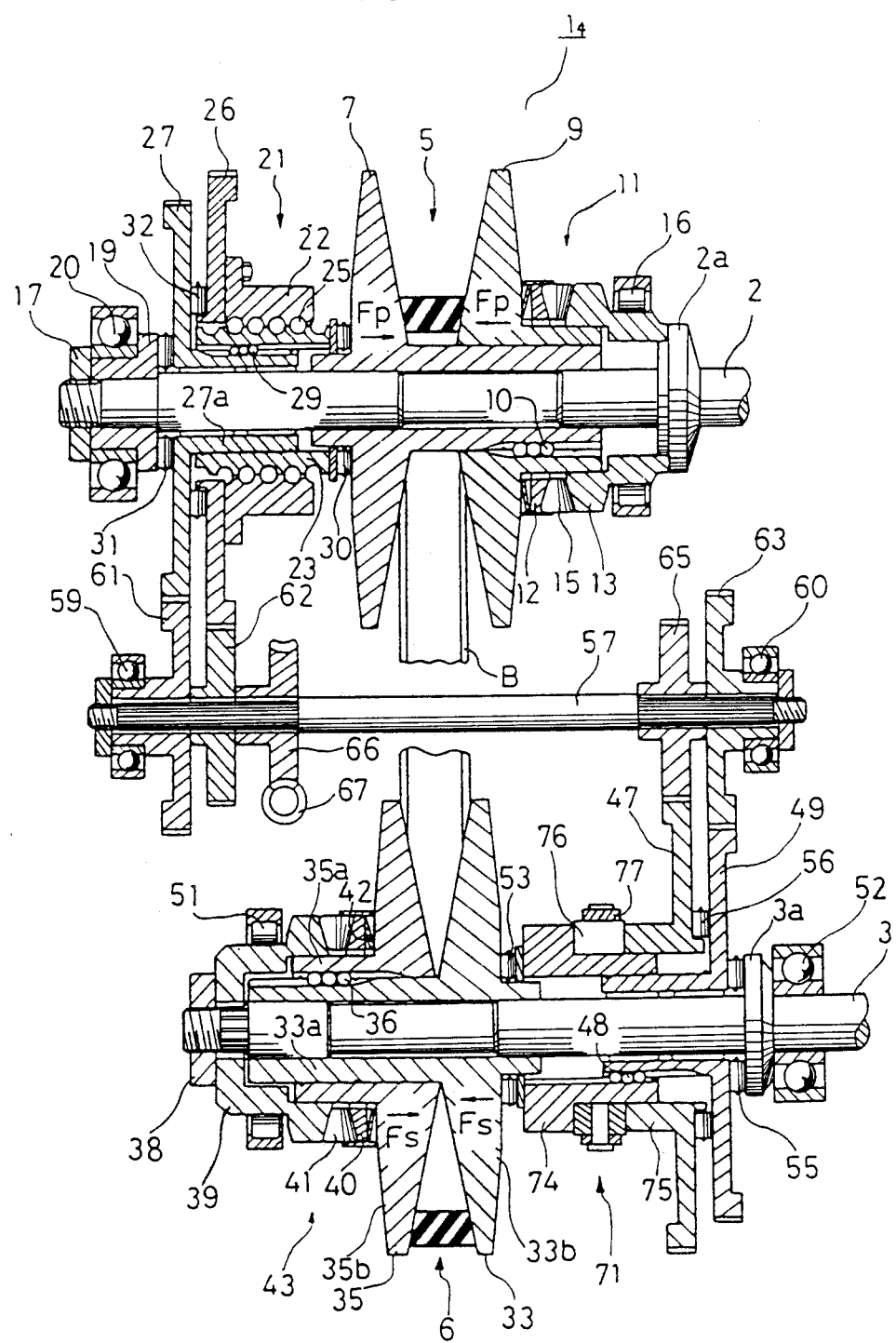
FIG. 4 is a cross sectional view of the fourth embodiment of the present invention.
Figure 5:
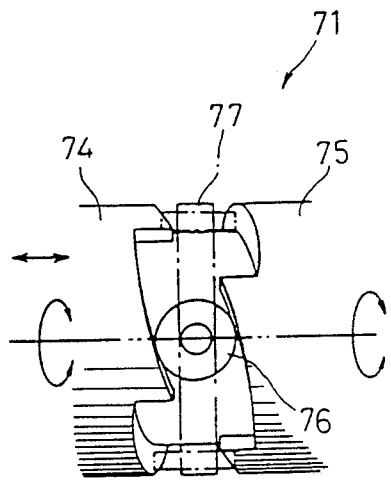
FIG. 5 is a front view of the roller cam mechanism used in the fourth embodiment.

As shown in FIG. 4, the secondary pulley 6 of the fourth embodiment consists of two sheaves 33 and 35, wherein the hub portion 33a of the movable sheave 33 is rotatably and slidably mounted on shaft 3, and connected to the hub portion of the fixed sheave 35 through ball spline 36, allowing axial sliding motion only. Between the backside of flange portion 35b of fixed sheave 35 and the fixed race 39 fixed to the end of shaft 3 by nut 38, a load cam mechanism 43, consisting of movable race 40, tapered rollers 41 and disk spring 42, is inserted. A roller cam mechanism 71 comprising the actuator mechanism is inserted between the flange portion 3a on shaft 3, and the backside of flange portion 33b of movable sheave 33. As shown in detail in FIG. 5, the roller cam mechanism consists of a movable end cam 74, supporting end cam 75 and several rollers 76 placed between the two end cams The rollers 76 are distributed around the circumference and held in their designated angular positions by the ring 77. The rollers move in axial direction either linearly or non-linearly with respect to the relative rotational angle between the two end cams 74 and 75. A large gearwheel 47 is formed integrally with the supporting end cam 75, while the hub portion of a small gearwheel 49 is connected through ball spline 48 to the inner face of the hub portion of movable end cam 74. 51 and 52 designate the bearings which support the shaft 3, and 53, 55 and 56 designate the thrust bearings supporting the axial force $F_s$ exerted by sheave 33. Under the torque transmitting condition described above, owing to the axial forces $F_p$ and $F_s$ generated by the load cam mechanisms 11 and 43, disk springs 14 and 42 are both compressed against the movable race 12 and sheave 9, or movable race 40 and sheave 35, leaving no gaps in between.

As the present embodiment is constructed in the manner described above, when the worm 67 is, for example, rotated in the clockwise or upshift direction, worm-wheel 66 is rotated clockwise as viewed from the right side of the Figure, causing gearwheels 61, 62, 63 and 65 to rotate by countershaft 57. Gearwheels 26 and 27 of the ball screw mechanism 21 on the primary shaft are therefore rotated counterclockwise, wherein the smaller gearwheel 27 rotates faster compared to the larger gearwheel 26, owing to the difference in their numbers of teeth. Hence the male thread portion 23, which is entrained to rotate with gearwheel 27 through ball spline 29, rotates faster as compared with the female thread portion 22 which rotates with gearwheel 26, causing the ball screw mechanism 21 to expand rightward, which in turn causes the movable sheave 7 to narrow the gap separating it from the fixed sheave 9, thus increasing the effective diameter of belt B. Similarly, the rotation of countershaft 57 is transmitted to gearwheels 49 and 47 of the cam mechanism 71 on the secondary shaft through gearwheels 63 and 65. As the supporting end cam 75 which rotates with gearwheel 47 is prevented from moving axially by thrust bearings 56 and 55, the movable cam 74 which rotates with gearwheel 49 contracts rightwardly owing to the relative counter-clockwise rotation between gearwheels 47 and 49, causing the movable sheave 33 to widen the gap separating it from the fixed sheave 35. Thus, the movable sheaves 7 and 33 act in concert to shift and adjust the belt B to an upshift position.

When the worm 67 is rotated in a counter-clockwise, or downshift direction, the above process is reversed, wherein the ball screw mechanism 21 on the primary shaft contracts leftward and the cam mechanism 71 on the secondary shaft expands leftward, so that the movable sheaves 7 and 33 of pulleys 5 and 6 shift the belt B in the downshift direction.

As has been explained for the first embodiment, in this embodiment also, the ball screw mechanism 21 converts the axial force $F_p$ from the movable sheave 7 into torque and exerts it on countershaft 57, whereas the roller cam mechanism 71 similarly generates a torque between the end cams 74 and 75 owing to the axial force $F_s$ from the movable sheave 33, and exerts it on countershaft 57. Thus, as in the first embodiment, the drive ratio can be altered with a slight driving effort equivalent to the difference between the two torques.

Whereas explanation has been made above with a ball screw mechanism 21 on the primary shaft, and a cam mechanism 71 on the secondary shaft, the arrangement may be reversed, with the cam mechanism 71 on the primary shaft and the ball screw mechanism 21 on the secondary shaft. Needless to say, the cam mechanism 71 may also be used on both primary and secondary shafts.

The fifth embodiment of the present invention, which is a partial modification of the fourth embodiment, shall now be described.

Figure 6:
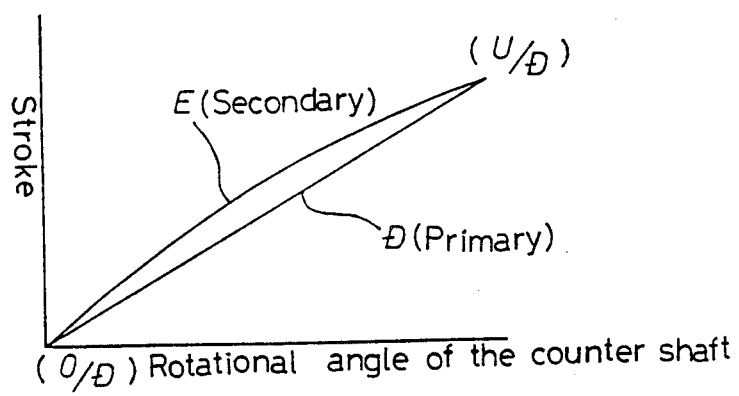
FIG. 6 shows the movements of the actuator means on primary and secondary shafts according to the fifth embodiment.
Figure 17:
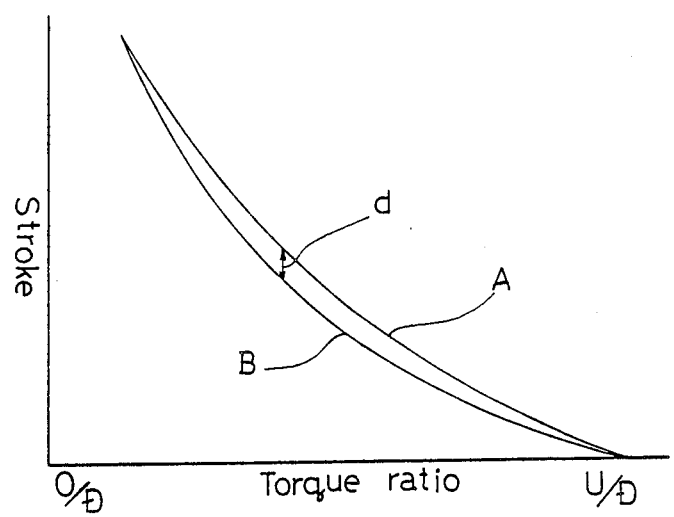
FIG. 17 shows the proper displacements of the movable sheaves of both primary and secondary pulleys as determined by the belt.

In the fifth embodiment, the cam mechanism 71 making up the actuator mechanism on the secondary shaft of the fourth Cmbodiment, consists of a non-uniform stroke cam mechanism. Whereas the ball screw mechanism 21, serving as the actuator mechanism on the primary shaft, moves at with a uniform stroke with respect to angle of rotation indicated by line D shown in FIG. 6, the movable end cam 74 of the non-uniform stroke cam mechanism 71 moves at non-uniform stroke along curve E, to absorb the error or difference d shown in FIG. 17.

Thus, while the ball screw mechanism 21 on the primary shaft expands and contracts with a uniform stroke, to alter the effective diameter of belt B by shifting the movable sheave 7 in relation to fixed sheave 9 through thrust bearing 30, the non-uniform stroke cam mechanism 71 on the secondary shaft contracts or expands with a non-uniform stroke, to shift the movable sheave 33 in relation to fixed sheave 35. The movable sheave 7 on the primary shaft moving with a uniform stroke, and the movable sheave 35 on the secondary shaft moving with a non-uniform stroke work together to absorb the error d (refer to FIG. 17) at a given drive ratio, moving and adjusting the movable sheaves 7 and 33 to their proper positions determined by the belt B.

During transition from positive to negative torque transmission and vice versa, although relative rotation occurs in the load cam mechanisms 11 and 43, little axial movement occurs in them, because the movable sheaves 7 and 33 of pulleys 5 and 6 are in their proper positions as determined by the belt B, and the tapered rollers 15 and 41 of the load cam mechanisms 11 and 43 are positioned against the bottom of the troughs of the cam faces. Any axial movement in the load cam mechanisms is absorbed by the disk springs 14 and 42, thus maintaining the clamping forces on the belt during the reversing of torque transmission. When transmitting negative torque, the secondary shaft acts as the input shaft, while the primary shaft acts as the output shaft, transmitting power by clamping the belt with the axial forces corresponding to the torque transmitted.

The sixth embodiment of the present invention, which is a further modification of the fourth embodiment, shall now be described, while referring to FIGS. 7 and 8. Components similar to those in the fourth embodiment are designated by the same characters, and their description shall be omitted.

Figure 7:
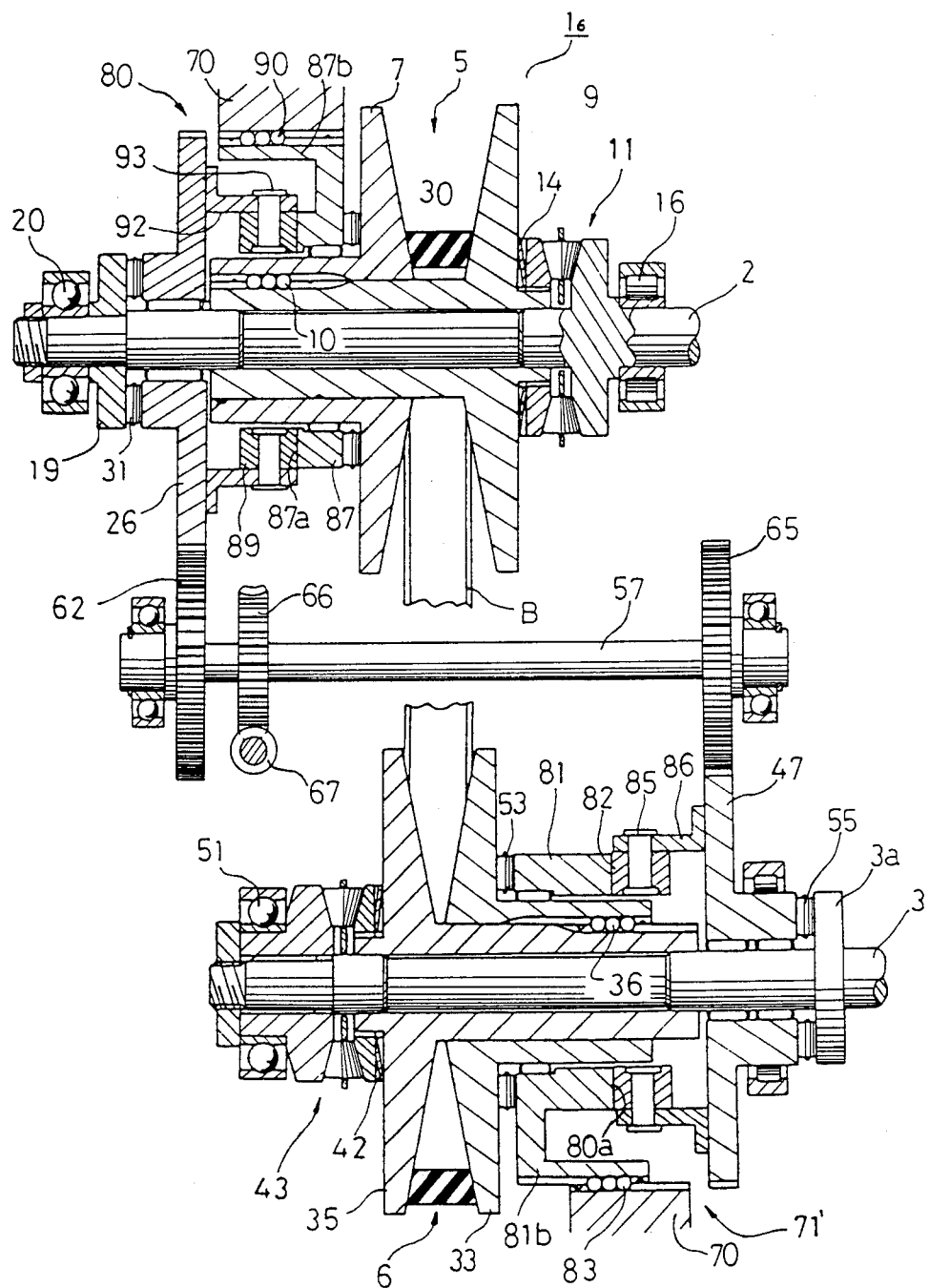
FIG. 7 is a cross sectional view of the sixth embodiment of the present invention.
Figure 8:
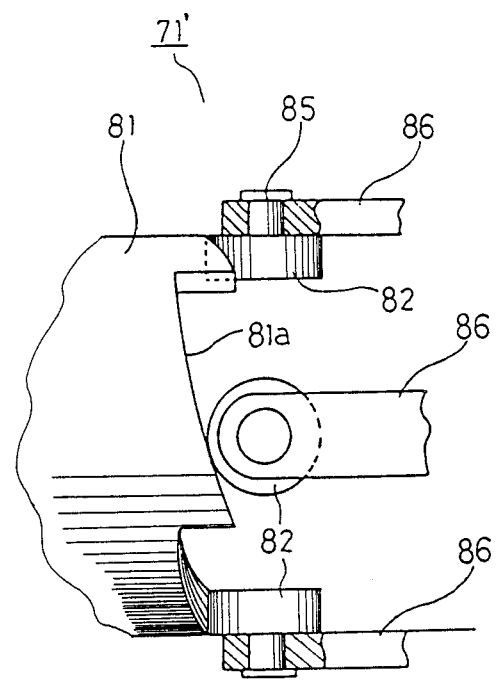
FIG. 8 is a front view of the roller cam mechanism used in the fourth embodiment of FIG. 4.

The continuously variable V-belt transmission $1_6$ according to the present embodiment, has roller cam mechanisms 80 and 71' as actuator mechanisms on the primary and secondary shafts respectively, as shown in FIG. 7. The roller cam mechanism 71', as shown in FIG. 8, has an end cam 81 with a saw toothed cam face 81a of the required contour on one end, and rollers 82 bearing against the cam face 81a. The other end of cam 81 bears against the movable sheave 33 through thrust bearing 53, and has a guide portion 81b formed integrally, which is guided while preventing rotation, by the housing 70, through ball spline 83. Each roller 82 is rotatably supported on pin 85, located on the gearwheel 47 by arm 86. Meanwhile, the roller cam mechanism 80 on the primary shaft is constructed likewise to the roller cam mechanism on the secondary shaft. That is, the roller cam mechanism 80 has an end cam 87 with a saw tooothed cam face 87a, and rollers 89 bearing on the cam face, wherein the other end of cam 87 bears on the movable sheave 7 through thrust bearing 30, and the guide portion 87b of cam 87 is slidably but unrotatably guided by the housing through ball spline 90. Rollers 89 are rotatably supported on pins 93 on the ends of arms 92 extending from gearwheel 26. The gearwheels 26 and 47 on the primary and secondary shafts have the same number of teeth, and mesh respectively with gearwheels 62 and 65 fixed to the counter shaft 57. In the present embodiment, the ball spline 10 and 36 connecting the movable sheaves 7, 33 and fixed sheaves 9, 35 are located on the inner bore of the cam mechanisms 71' and 80.

According to the sixth embodiment constructed as described above, the rotation of countershaft 57 caused by the rotation of worm 67 is transmitted to gearwheels 26 and 47 on the primary and secondary shafts, through gearwheels 62 and 65. This causes rollers 89 to rotate about shafts 2 and 3 with the gearwheels 26 and 47 relative to end cams 87 and 81, which are prevented from rotating by ball splines 90 and 83. Hence both end cams 87 and 81 of the roller cam mechanisms 80 and 71' move axially, shifting and adjusting the movable sheaves 7 and 33 of the primary and secondary pulleys 5 and 6, according to the designated drive ratio.

By using a uniform stroke cam mechanism for the cam mechanism 80 on the primary shaft, and a non-uniform stroke cam mechanism for the cam mechanism 71' on the secondary shaft, the movable sheaves cam be adjusted in accordance with their proper displacements as determined by the belt B, in a manner similar to the fifth embodiment.

Figure 10:
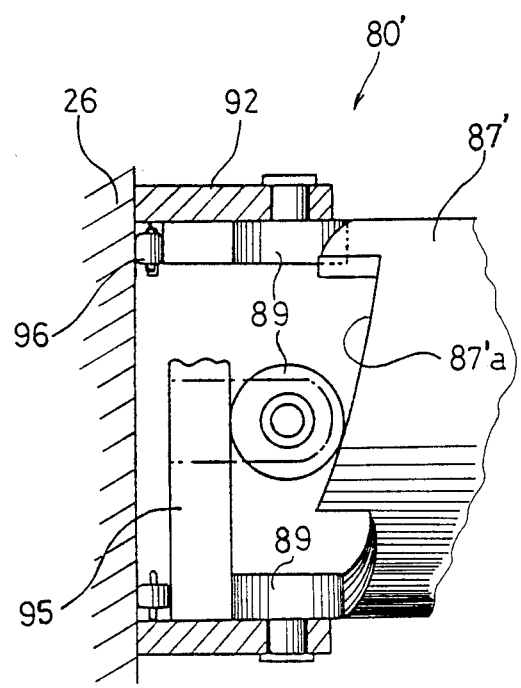
FIG. 10 is a front view of the non-uniform stroke mechanism used in the seventh embodiment of FIG. 9.

The seventh embodiment of the present invention shall now be described making reference to FIGS. 9 and 10. For this embodiment also, components which are identical to those in previous examples are designated by the same characters, and an explanation shall be omitted.

Figure 9:
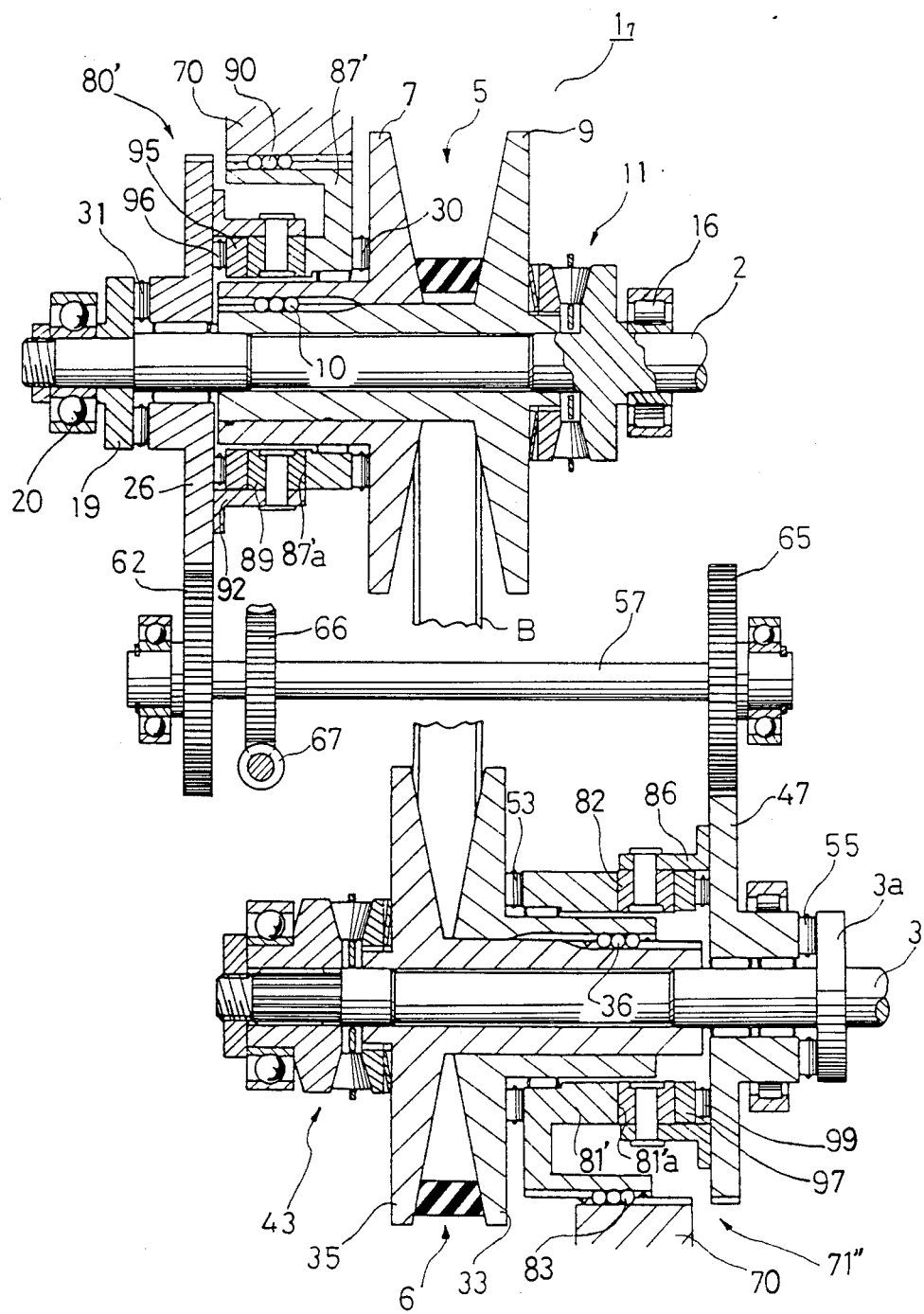
FIG. 9 is a cross sectional view of the seventh embodiment of the present invention.

As shown in FIG. 9, on the continuously variable V-belt transmission $1_7$ of the present embodiment, the actuator means 80' on the primary shaft comprises of a non-uniform stroke cam mechanism, wherein the actuator means 71'' on the secondary shaft comprises of a unifrom stroke cam mechanism. As shown in detail in FIG. 10, the non-uniform stroke cam mechanism 80' consists of an end cam 87' with cam face 87'a of curved contour and rollers 89 bearing against the cam face 87'a The end cam 87' bears against the movable sheave 7 through thrust bearing 30 at its other end, and is slidably engaged with housing 70 through ball spline 90. Rollers 89 are supported or arms 92 located on gearwheel 26, and a reace 95 for supporting the axial force is placed opposite to cam face 87'a, with a thrust bearing 96 inserted between the race 95 and gearwheel 26. In the uniform stroke cam mechanism 71'', an end cam 81' with cam face 81'a which produces a uniform stroke, bears against the movable sheave 33 through thrust bearing 53, and at the same time slidably engages with housing 70 through ball spline 85. Rollers 82 are located on gearwheel 47 by arms 86, and bear against a race 97 placed opposite to cam face 81'a for supporting the axial force, with a thrust bearing 99 inserted between the race 97 and gearwheel 47.

Figure 11:
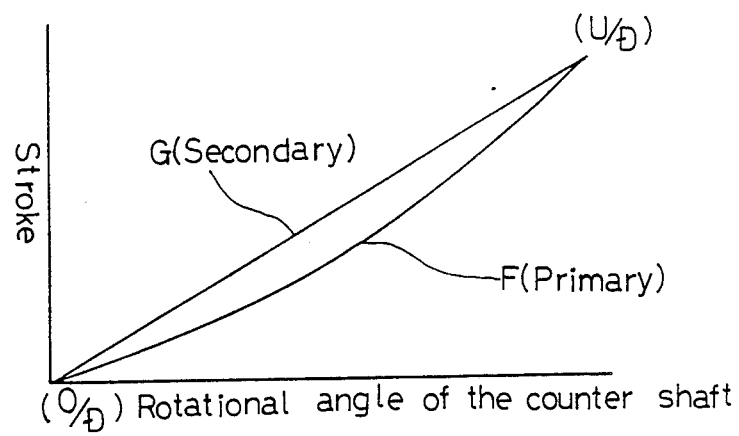
FIG. 11 shows the movements of both actuator means according to the seventh embodiment.

According to the present embodiment, the end cams 87' and 81' move axially when rollers 89 and 82 of actuator means 80' and 71'' are rotated by turning the countershaft 57. In doing so, the end cam 87' on the primary shaft which has a non-uniform stroke cam face, moves with a non-uniform stroke with respect to the rotation angle as indicated by curve F in FIG. 11, while the end cam 81' on the secondary shaft which has a uniform stroke cam face, moves with a uniform stroke as indicated by line G in the same figure. Thus the two movable sheaves 7 and 33 are displaced by their proper displacements as determined by belt B, to establish the required drive ratio. The axial forces exerted by movable sheaves 7 and 33 act on rollers 89 and 92 through thrust bearings 30, 53 and end cams 87', 81', but because the rollers 89 and 82 are supported directly through supporting races 95, 97 and thrust bearings 96, 99 by gearwheels 26 and 47 which are prevented from moving axially relative to shafts 2 and 3 by thrust bearings 31 and 55, no axial force is exerted on arms 92 and 86, thus avoiding excessive loads on rollers 89 and 82 and enabling swift alteration of drive ratio with slight effort.

Whereas one of the movable sheaves of pulleys 5 or 6 is shifted with a uniform stroke in the fifth, sixth and seventh embodiments, the movable sheaves on both pulleys may be shifted with a non-uniform stroke. Whereas the rollers are rotated and the end cams are shifted axially in the stroke cam mechanisms of the above embodiments, it is evident that this relationship may be reversed.

Also, whereas in the fifth embodiment, identical relative rotation is given to the ball screw mechanism 21 and non-uniform stroke cam mechanism 71 to alter the drive ratio, depending on the contour of the cam face of cam mechanism 50, the displacements of movable sheaves 7 and 33 may be matched by selecting the gear ratios between the counter shaft 57 and shafts 2 and 3. Likewise, the contours of the cam faces may be differentiated, and the gear ratios selected appropriately, in the sixth and seventh embodiments also.

The eighth embodiment of the present invention shall now be described, making reference to FIGS. 12 through 16. The present embodiment of the invention is characterized by the use of non-linear gearing for transmitting the rotation of counter shaft 57 to the actuator means on the primary and secondary shafts of the second embodiment shown in FIG. 2.

Figure 12:
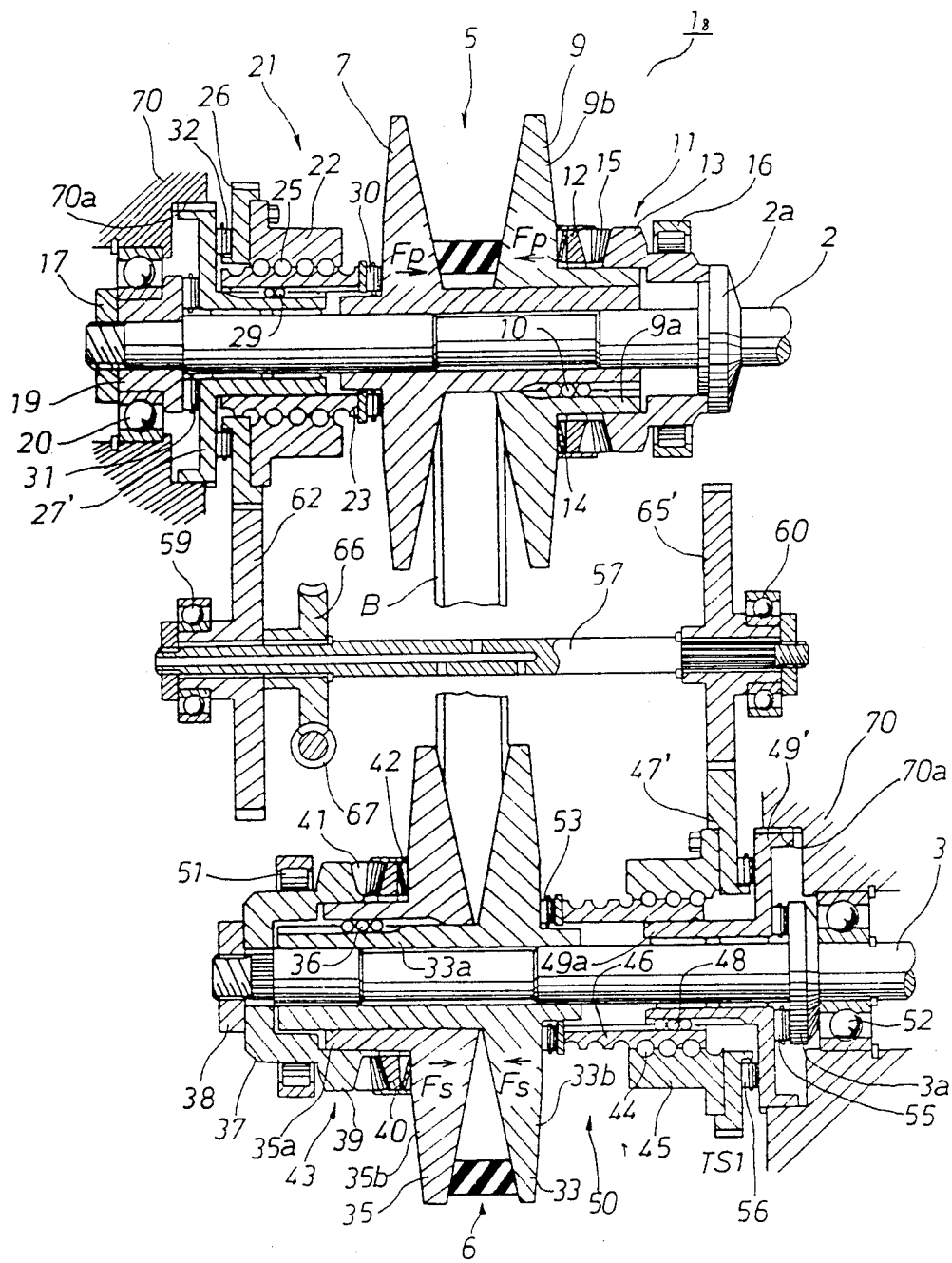
FIG. 12 is a cross sectional view of the eighth embodiment.

As shown in FIG. 12, in the continuously variable V-belt transmission $1_8$ of the eighth embodiment, a countershaft 57, whose ends are rotatably supported by bearings 59 and 60, is located between the primary and secondary shafts 2 and 3. On one end of the countershaft 57, a circular gearwheel 62 is fixed through splines, where gearwheel 62 meshes with another circular gearwheel 26 fixed to the female thread portion 22 of ball screw mechanism 21 on the primary shaft. On the other end of shaft 57, a non-circular gearwheel 65' is fixed through splines, where gearwheel 65' meshes with another non-circular gearwheel 47' fixed to the female thread portion 45 of ball screw mechanism 50 on the secondary shaft. The gear ratio between the two non-circular gearwheels (rc/rs) gradually increases with the rotation of countershaft 57 in the overdrive (O/D) direction, where rs and rc each denote the radii of gearwheels 47' and 65' at their meshing point.

Figure 13:
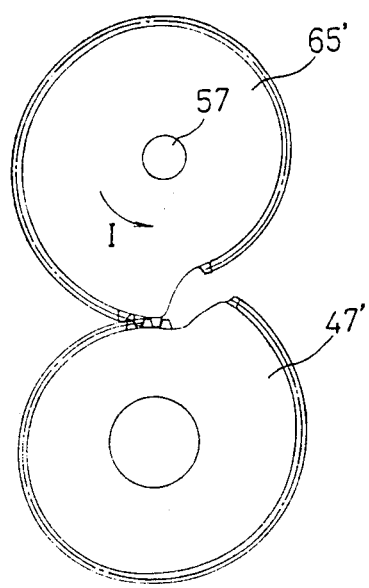
FIG. 13 is a side view of the non-linear gearing used in the eighth embodiment in overdrive condition of FIG. 12.
Figure 14:
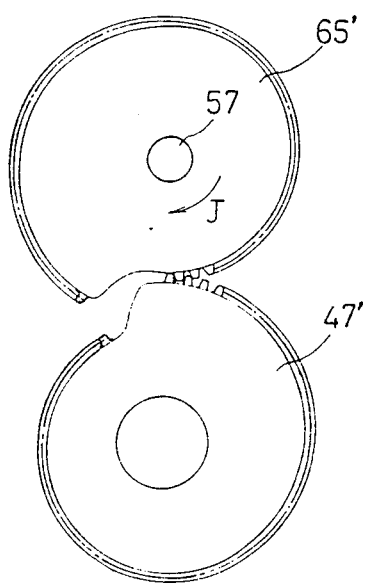
FIG. 14 ia a side view of the non-linear gearing used in the eighth embodiment in underdrive condition of FIG. 12.
Figure 15:
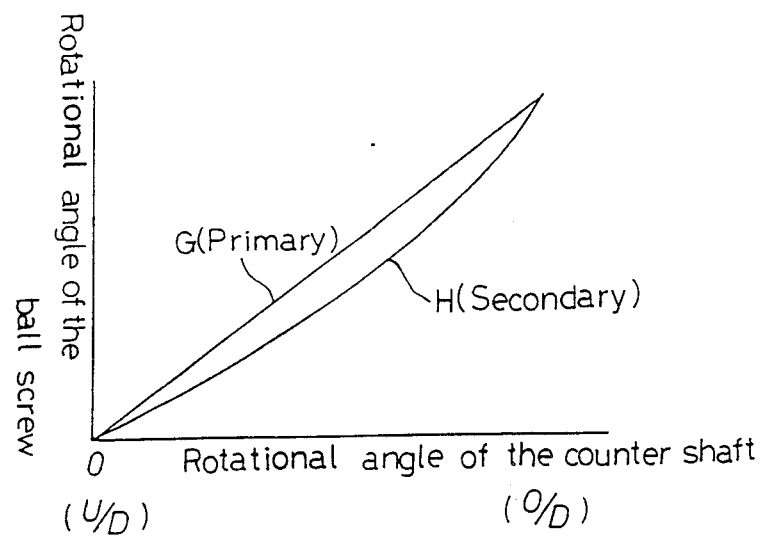
FIG. 15 shows the relationship between the rotational angles of the counter shaft and the ball screw mechanism.
Figure 16:
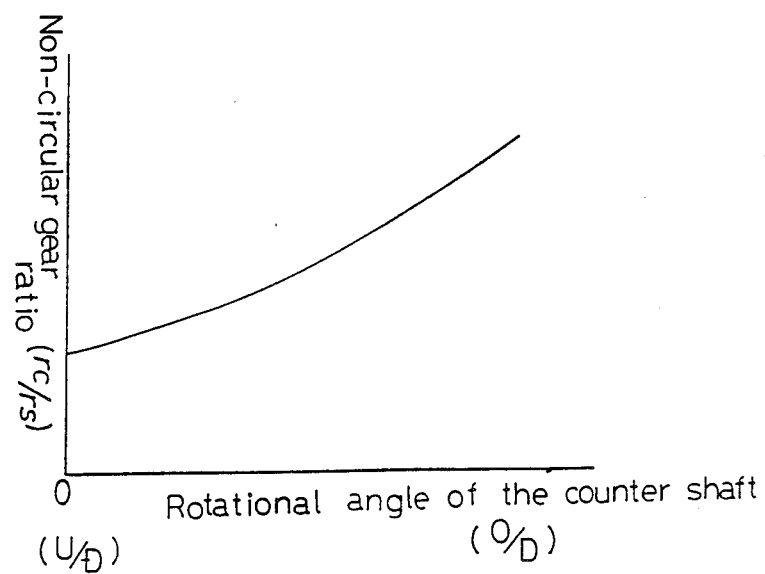
FIG. 16 shows the gear ratio of the non-circular gearwheels in relation to the rotational angle of the counter-shaft.

To alter the drive ratio on this continuously variable V-belt transmission $1_8$, the rotation of worm 67 is controlled by parameters representing the operating condition of the vehicle, such as vehicle speed, throttle setting, and engine revolutions. For instance, if the worm 67 is turned in the clockwise, or upshift direction, wormwheel 66 is rotated clockwise when seen from the right hand side of the figure, causing gearwheels 62 and 65' to rotate in the same direction through countershaft 57. Gearwheel 26 is then rotated anti-clockwise in unison with the female thread portion 22 of ball screw mechanism 21 on the primary shaft, the female thread portion 22 being rotated in relation to the male thread portion 23 which is prevented from rotating by the fixed housing 70 through ball spline 29 and member 27'. This causes the male thread portion 23 of the ball screw mechanism 21 to extend rightward, shifting the movable sheave 7 through thrust bearing 30 to narrow the gap between sheaves 7 and 9, thus increasing the effective diameter of belt B. Likewise, owing to the counterclockwise rotation of gearwheel 47', the female thread portion 45 fixed to gearwheel 47' rotates relative to the male thread portion 46 which is prevented from rotating by ball spline 48 and member 49'. This causes the left hand male thread portion 46 of the ball screw mechanism 50 to contract rightward, shifting the movable sheave 33 to widen the gap between the sheaves 7 and 9, thus reducing the effective diameter of belt B. During this process, the ball screw mechanism 21 on the primary shaft rotates in linear relationship to the rotational angle of countershaft 57, as indicated by line G in FIG. 15, because gearwheels 62 and 62 on the primary end are circular, but because gearwheel 65' and 47' on the secondary end are non-circular, the ball screw mechanism 50 on the secondary shaft rotates in a non-linear relationship to the rotational angle of countershaft 57, as indicated by curve H in FIG. 15. In effect, rotation is transmitted between gearwheel 65' and 47' while gradually increasing the gear ratio as the counter shaft 57 is rotated in the direction indicated by arrow J, as shown in FIG. 14, attaining maximum overdrive condition in the position illustrated in FIG. 13. Thus, the movable sheave 33 of the secondary pulley 6 is shifted in a nonlinear relationship with respect to the movable sheave 7 of the primary pulley 5, matching the displacements of the two movable pulleys to their proper displacements determined by belt B.

By turning the worm 67 in the anti-clockwise, or downshift direction, the process described above for upshift is reversed, contracting the ball screw mechanism 21 on the primary shaft leftward, and extending the ball screw mechanism 50 on the secondary shaft leftward, to adjust the two pulleys 5 and 6 in the downshift direction. During this process also, as shown in FIG. 13, rotation is transmitted between gearwheels 65' and 47' while gradually decreasing the gear ratio as the countershaft 57 is rotated in the direction indicated by arrow I, attaining maximum underdrive condition in the position illustrated in FIG. 14. Thus, likewise to the case of upshift described before, the movable sheave 33 on the secondary shaft shifts in a non-linear manner, to match the displacements of movable sheaves 7 and 33 on the primary and secondary shafts with their proper displacements as determined by belt B.

Whereas in the above embodiment, gearwheels 65' and 47' constituting the gearing on the secndary end are non-circular while gearwheels 62 and 26 constituting the gearing on the primary end are circular, this arrangement may be reversed, with non-circular gearwheels 62 and 26, and circular gearwheels 65' and 47'. The gearing on both ends of the countershaft 57, that is gearwheels 62 and 26, and gearwheels 65' and 47', may all be non-circular as well.

Also, whereas in the above embodiment, load cam mechanisms 11 and 43 are placed on both primary and secondary shafts, the load cam mechanism may be placed on either one of the shafts only. Instead of gearwheels used in rotating the actuator means 21, 21', 50, 50', 71, 71', 71'', 80 and 80', chains may be used in connecting them to the countershaft 57. By using chains, the gearwheels, or sprockets, can be reduced in diameter, enabling reduction in the overall dimensions of the device.

Further, instead of driving the countershaft 57 through worm 67 or gearwheel 61, the shaft 57 may be driven by a motor connected directly to it.

The advantages offered by the embodiments of the present invention described above are as follows:

By generating axial forces $F_p$ and $F_s$ corresponding to the transmitted torque by load cam mechanisms 11 and 43, while altering drive ratios by actuator means 21, 21', 50, 50', 71, 71'', 80 and 80', an extremely simplified construction is possible. As the clamping force on belt B changes with the torque to be transmitted, no excessive clamping force occurs, improving transmission efficiency and extending belt life. Even in the event of a breakdown in the shift driver means, the belt clamping force is maintained, avoiding loss of transmission capability. Also, by adjusting the actuator means 21, 50, etc. through gearing by the rotation of countershaft 57 driven by shift driver means M and 67, the two pulleys are adjusted under rigid mechanical interconnection at any given drive ratio.

Although the belt clamping force changes with transmitted torque, the establishment of drive ratio is simple, and moreover, unlike those which rely on the balancing of axial forces acting on the two pulleys in establishing the drive ratio, no hunting occurs, so that the desired drive ratio can be established reliably with a simple shift driver mechanism.

Because countershaft torques are always exerted on the countershaft in the continuously variable transmissions $1_1$–$1_8$ while transmitting power, the shaft drive means need only to apply a driving effort equivalent to the difference between the torques, thus enabling swift and reliable establishment of any desired drive ratio with a slight effort. Especially, when ball screw mechanisms 21 and 50 are used as actuator means, a high conversion efficiency between axial force and torque is obtained owing to the rolling contact in the mechanisms, and the above effect is more pronounced.

Because the axial forces $F_p$ and $F_s$ occuring at pulleys 5 and 6 are carried directly by shafts 2 and 3 through the actuator means or load cam mechanisms, the very large axial forces for clamping the belt B are cancelled within each shaft 2 or 3 in the form of tensile forces acting in opposing directions, and are not exerted on the housing, thus enabling the use of a lightweight and compact housing.

By using a non-uniform stroke cam mechanism 71, 71' or 80', or by using non-linear gearing 65' and 47' between the countershaft 57 and actuator means, the movable sheaves 7 and 33 on pulleys 5 and 6 can be located in their proper positions as determined by belt B at any drive ratio. Hence the axial movement of the load cam mechanisms 11 and 43, when switching from positive to negative torque transmission or vice verse, is limited, preventing shock on the load cam mechanisms, and improving the durability of the continuously variable transmission.

What is claimed is:

1. A continuously variable belt transmission comprising:
   a primary and a secondary shaft for transmitting torque,
   a primary and a secondary pulley on the respective shafts, each pulley comprising a pair of sheaves axially movable in relation to one another,
   said pulleys being opposed to each other for carrying a belt therebetween,
   means for shifting the sheaves of each of said pairs of sheaves axially relative to each other,
   means attached to said shifting means for actuating said shifting means for moving one of said pairs of sheaves nonlinearly relative to the relative movement of the sheaves of the other pair of axially movable sheaves, and for matching the axial displacements of said pairs of sheaves with the displacements required to keep the belt constantly taut with said pulleys.

2. The transmission of claim 1, wherein said means for nonlinearly moving one of said pairs of sheaves comprises nonlinear gearing means.

3. The transmission of claim 2, wherein said nonlinear gearing means comprises a countershaft and gearing carried by said countershaft.

4. The transmission of claim 3, wherein said means for shifting each sheave comprises a respective shifter for each pair of sheaves.

5. The transmission of claim 4, wherein said gearing further comprises at least one noncircular gear.

6. A continuously variable V-belt transmission comprising:
   a primary and a secondary shaft for transmitting torque,
   a primary and a secondary pulley on the respective shafts, each pulley comprising a pair of sheaves axially movable in relation to one another, an endless belt placed around the two pulleys, a loading means being provided on at least one of the pulleys for applying an axial force corresponding to the torque transmitted by the respective shaft of said at least one pulleys, a ball screw mechanism having at least two relatively rotatable components and being provided on each pulley for shifting the movable sheave of each pulley axially, a countershaft being located between the two pulleys, respective gearing means drivingly connecting the countershaft and said each ball screw mechanism, means for drivingly connecting said countershaft to a shift driver means, and for driving said each ball screw mechanism through said gearing means, wherein the axial forces acting on the two pulleys are carried by their respective shafts directly or though said ball screw mechanism or said loading means, whereby the force required to actuate said means for drivingly connecting said countershaft to a shift driver means is equivalent to the difference between said counteracting torques.

7. The continuously variable V-belt transmission of claim 6, wherein said loading means comprises a cam mechanism comprised of two components of which at least one is rotatable.

8. The continuously variable V-belt transmission of claim 7, wherein said cam mechanism is a roller cam mechanism, in which rollers are inserted between two cam components, or in which rollers comprise either one of the two components.

9. The continuously variable V-belt transmission of claim 7, wherein the two components of said cam mechanism are each drivingly connected to the counter shaft through gearing of differing gear ratios.

10. The continuously variable V-belt transmission of claim 7, wherein either one of the two components of said cam mechanism is unrotatably engaged with a fixed component, while the other component is drivingly connected to the counter shaft through gearing.

11. The continuously variable V-belt transmission of claim 7, wherein either one of the two component of said cam mechanism is slidably engaged with the gearing or fixed component.

12. The continuously variable V-belt transmission of claim 7, wherein said cam mechanism is a non-uniform stroke cam mechanism, and wherein the displacements of the movable sheaves of the two pulleys are matched with their proper displacements determined by the belt, by differentiating the axial displacements of the two actuator means.

13. The continuously variable V-belt transmission of claim 12, wherein one of said actuator means comprises thread mechanism, while the other actuator means comprises non-uniform stroke cam mechanism.

14. The continuously variable V-belt transmission of claim 12, wherein one of said actuator means consists of uniform stroke cam mechanism, while the other actuator means comprises non-uniform stroke cam mechanism.

15. The continuously variable V-belt transmission of claim 12, wherein both of said actuator means comprises non-uniform stroke cam mechanisms.

16. The continuously variable V-belt transmission of claim 6, wherein one of said components of said ball screw mechanism is slidably engaged to said gearing.

17. The continuously varible V-belt transmission of claim 6, wherein one of said components of said ball screw mechanism is slidably engaged to said fixed component.

18. The continuously variable V-belt transmission of claim 6, wherein at least one of said gearing means comprises a nonlinear gearing for rotating at least one of the ball screw mechanisms in a nonlinear relationship relative to the rotation of said countershaft, and for matching the axial displacements of said movable sheaves of said primary and secondary pulleys with the displacements required to keep the belt constantly taut with said sheaves.

19. The continuously variable V-belt transmission of claim 6, wherein the loading means consists of load cam mechanism.

20. The continuously variable V-belt transmission of claim 19, wherein said load cam mechanism has a cam face of wavelike contour for converting both positive and negative torques into axial forces.

21. The continuously varible V-belt transmission of claim 19, said load cam mechanism comprising a movable race, a fixed race, and rollers disposed therebetween, and means being provided for urging together the movable race, rollers and fixed race comprising said load cam mechanism to keep them under mutual contact at all times.

22. The continuously variable V-belt transmission of claim 6, wherein said ball screw mechanisms comprise linear actuator mechanisms for moving a constant stroke in relation to a given angle of rotation, and wherein at least one of said gearings comprises nonlinear gearing for rotating at least one of said ball screw mechanisms in a nonlinear relationship relative to the rotation of said countershaft, and for matching the axial displacements of said movable sheaves of said primary and secondary pulleys with their respective proper displacements as determined by the belt.

23. The continuously variable V-belt transmission of claim 22, wherein said linear actuator mechanism of said ball screw mechanisms comprises threads.

24. The continuously variable V-belt transmission of claim 22, wherein said nonlinear gearing comprises a noncircular gearwheel.

25. The transmission of claim 1, wherein said means for shifting said pairs of sheaves axially comprises a shifter for each pair of sheaves, and said means for actuating said shifting means comprises one gear means for each shifter, and at least one of said gear means being nonlinear gearing.

26. The continuously variable V-belt transmission of claim 6, wherein one of said at least two components of said ball screw mechanism is nonrotatably engaged with a fixed component, while another one of said components is drivingly connected to said countershaft through said gearing.

27. The continuously variable V-belt transmission of claim 6, wherein said actuator means consists of a thread mechanism.

28. The continuously variable V-belt transmission of claim 27, wherein the male and female thread portions of said thread mechanism are each drivingly connected to said countershaft through gearing with differing gear ratios.

* * * * *